(12) United States Patent
Rober et al.

(10) Patent No.: US 6,994,014 B2
(45) Date of Patent: Feb. 7, 2006

(54) CLOSED CAVITY PISTON FOR HYDROSTATIC POWER UNITS AND METHOD OF MANUFACTURING THE SAME

(75) Inventors: Daryl I. Rober, Ames, IA (US);
Michael A. Betz, Huxley, IA (US);
Robert J. Klinkel, Ames, IA (US)

(73) Assignee: Sauer-Danfoss Inc., Ames, IA (US)

( * ) Notice: Subject to any disclaimer, the term of this patent is extended or adjusted under 35 U.S.C. 154(b) by 11 days.

(21) Appl. No.: 10/879,336

(22) Filed: Jun. 29, 2004

(65) Prior Publication Data
US 2005/0284289 A1    Dec. 29, 2005

(51) Int. Cl.
*F01B 31/10*    (2006.01)

(52) U.S. Cl. .................... 92/158; 92/176; 92/181 R

(58) Field of Classification Search .................... 92/71, 92/158, 159, 176, 181 R, 187
See application file for complete search history.

(56) References Cited

U.S. PATENT DOCUMENTS

| | | | |
|---|---|---|---|
| 4,191,095 A | * | 3/1980 | Heyl .................. 92/181 R |
| 4,216,704 A | * | 8/1980 | Heyl .................. 92/181 R |
| 4,345,509 A | * | 8/1982 | Bridwell et al. ............ 92/78 |
| 4,627,793 A | * | 12/1986 | Kuroyanagi et al. ........... 92/78 |
| 5,554,338 A | | 9/1996 | Sugihara et al. |
| 5,642,654 A | * | 7/1997 | Parekh et al. ................ 92/187 |
| 6,293,185 B1 | * | 9/2001 | Stoppek et al. ............... 92/176 |
| 6,314,864 B1 | | 11/2001 | Beck et al. |
| 6,431,051 B1 | * | 8/2002 | Stoppek et al. ............... 92/71 |
| 6,491,206 B2 | | 12/2002 | Stoppek |
| 6,551,551 B1 | | 4/2003 | Gegel et al. |
| 6,588,321 B1 | | 7/2003 | Stoppek |
| 6,662,709 B1 | * | 12/2003 | Beutler ........................ 92/176 |

FOREIGN PATENT DOCUMENTS

EP    1336449    8/2003

* cited by examiner

*Primary Examiner*—Thomas E. Lazo
*Assistant Examiner*—Michael Leslie

(57) ABSTRACT

Disclosed is a closed cavity piston made from a metal injection molding process. The piston has an elongated cylindrical body with a first end that is adapted to receive a slipper. The piston also has at least one hollow compartment and a hollow stem that transports hydraulic fluid. After the metal injection molding process an end cap having a central opening is sinterbonded to the second end of the body. The central opening aligns with the hollow stem to provide a fluid outlet.

10 Claims, 2 Drawing Sheets

CLOSED CAVITY PISTON FOR HYDROSTATIC POWER UNITS AND METHOD OF MANUFACTURING THE SAME

BACKGROUND OF THE INVENTION

This invention relates to a closed cavity piston for a hydrostatic power unit. More specifically and without limitation, this invention relates to a new method of manufacturing a closed cavity piston by using metal injection molding techniques to form the body of the closed cavity piston and then sinterbonding an end cap on the piston body.

A closed cavity piston is a piston that includes one or more sealed hollow compartments within the piston. The reduced piston weight provided by the hollow compartments allow for greater hydrostatic shaft speeds, whereas the closed piston end reduces the amount of compressed oil volume in the hydrostatic unit and improves volumetric efficiency and control of swash plate moments. The piston includes a central tube for lubrication and an internal sphere that contacts an external sphere of a mating slipper. The piston also has either a deformable region near the piston sphere for joining the piston onto the slipper, or a deformable region near the slipper sphere for retaining the slipper to the piston depending on whether the piston is male or female.

There are several methods for manufacturing closed cavity pistons for hydrostatic units, but these methods have several cost and technical disadvantages. One method consists of positioning a hollow tube within a hollow piston body and attaching the tube to the piston body with one or more washers that extend radially between the outer wall of the tube and the inner wall of the piston body. The steps of this method include machining bar stock to create a one-piece hollow piston with integral stem, and then securing the stem with a washer. Next, a welder inertia welds a round slug onto the end of the piston. Finally one drills a hole through the stem over the length of the piston. This manufacturing method is very expensive and not practical for pistons with small diameters.

Another method is described in U.S. Pat. No. 6,314,864 and it consists of joining a piston cap to a piston body by welding or brazing. Compared to the method previously described, this method is less expensive and can be applied to small diameter pistons. Still, the manufacturing equipment required to join the cap and body is relatively expensive and the joining process requires an additional manufacturing step subsequent to the metal injection molding process. Furthermore, the joining method introduces additional radial alignment between the piston socket center and the piston body center that could interfere with methods used to join the piston onto the mating slipper.

Because of recent improvements in metal injection molding techniques, making hydraulic components with these techniques has become feasible. The basic process of metal injection molding is that a desirec shape may be created by carving the shape into two blocks of mold. This forms the outer surface of the product that is to be produced. Metallic mold inserts that may be repeatedly used form the interior of the product. Metal powder and non-metallic binding material are then injected into the mold and heated to form the shape dictated by the mold and the insert. After removing the product from the mold, debinding of the product occurs. The debinding process separates the metallic particles from the non-metal particles. After debinding, the product is sintered. Sintering is a process by which the metallic powder may be formed into a coherent mass without melting the material.

The same sintering process may be used to join together two or more components in contact with each other. This joining method, or "sinterbonding" process, is superior to conventional methods for combining metal injection molded components because other methods result in poor bond strength. The present invention uses metal injection molded components that are sinterbonded to produce a new closed cavity piston.

Thus, it is a primary object of the present invention to provide a new closed cavity piston that improves upon the state of the art.

Another object of the present invention is to minimize the amount of hydraulic fluid that flows through a closed cavity piston body.

Yet another object of the present invention is to optimize surface geometries between the closed cavity body and end cap to aid sinterbonding the two together.

Another object of the present invention is to provide a magnetic end cap that can capture magnetic particles present in a hydrostatic unit.

Yet another object of the present invention is to use a metal injection molding process and sintering to improve upon the state of the art.

Another object of the present invention is to provide a method of manufacturing a closed cavity piston that is inexpensive.

Yet another object of the present invention is to provide a method of manufacturing a closed cavity piston that can be made with great speed and efficiency.

Another object of the present invention is to provide a method of manufacturing a closed cavity piston using metal injecting molding to form all of the components.

Yet another object of the present invention is to provide a method for sinterbonding metal injected molding objects together to form a closed cavity piston.

Another object of the present invention is to provide a method for manufacturing a closed-cavity female piston that minimizes radial misalignment between the piston socket center and the center of the main piston body.

Yet another object of the present invention is to provide a joining technique that requires, at most, modification of the processes already employed in the metal injection molding process.

These and other objects, features, or advantages of the present invention will become apparent from the specification and claims.

BRIEF SUMMARY OF THE INVENTION

The present invention is a closed cavity piston design that can be manufactured inexpensively. The new design consists of a piston body and an end cap. Both components are manufactured using metal injection molding techniques. The piston body includes a central hollow stem and spherical socket that are integral to the rest of the piston body. The end cap is joined to the piston body using a sinterbonding process that metallurgically bonds the piston body and end cap contacting surfaces.

The sinterbonding process may take place during the normal sintering operation used in the processing of the metal injection molding components, requiring little, if any, additional processing time. Special fixturing and loading may be required during the debinding and/or sintering process to bring the cap and body into contact and to ensure a complete bonding between the end cap and the body.

DESCRIPTION OF THE PREFERRED EMBODIMENTS

Figure 1:
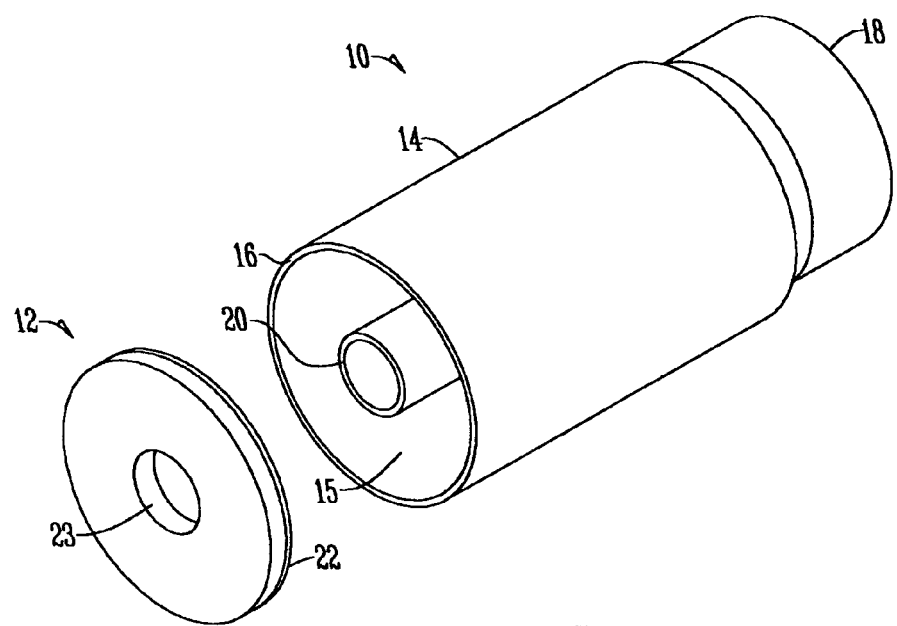
FIG. 1 is a perspective view of the closed cavity piston and end cap.

The present invention relates to a closed cavity piston 10 for reciprocation in the rotating cylinder block of a hydrostatic unit, such as a pump or a motor. FIG. 1 shows a closed cavity piston 10 having an end cap 12. Closed cavity piston 10 has an elongated body 14 that receives end cap 12 at open end 15. The piston body 14 may include tapered surface 16 at the open end 15, an end with a spherical cavity 18, and a hollow stem 20. The tapered surface 16 is used to align the end cap 12 and the body 14 together and to maximize the contact area between the two parts during the sinterbonding process, resulting in a more robust joint. The tapered surface 16 and tapered lip portion 22 of end cap 12 may differ slightly to ensure that complete contact is made as the two components are integrated. The tapered lip 22 and tapered surface 16 may be integrated either by mechanical means external to the parts, or through the formation of the parts during the sintering process. End cap 12 also has an opening 23 that aligns with hollow stem 20 forming a lubrication path through the piston. Opening 23 and stem 20 have corresponding tapered mating surfaces.

The end cap 12 may consist of a magnetic material to capture contaminates within the hydrostatic unit. The magnetic properties of the end cap 12 may also be used for other purposes, i.e., sensing the position and motion of the piston. Use of a magnetic end cap requires a reduction in the end cap 12 diameter to ensure that contaminates do not come between the piston outside diameter and the block bore.

It should also be appreciated that in an alternative embodiment the end cap 12 can have a non-tapered lip that optimizes the geometries between the end cap 12 and the body 14 to create a matingly fit to enhance the sinterbonding process.

Figure 2:
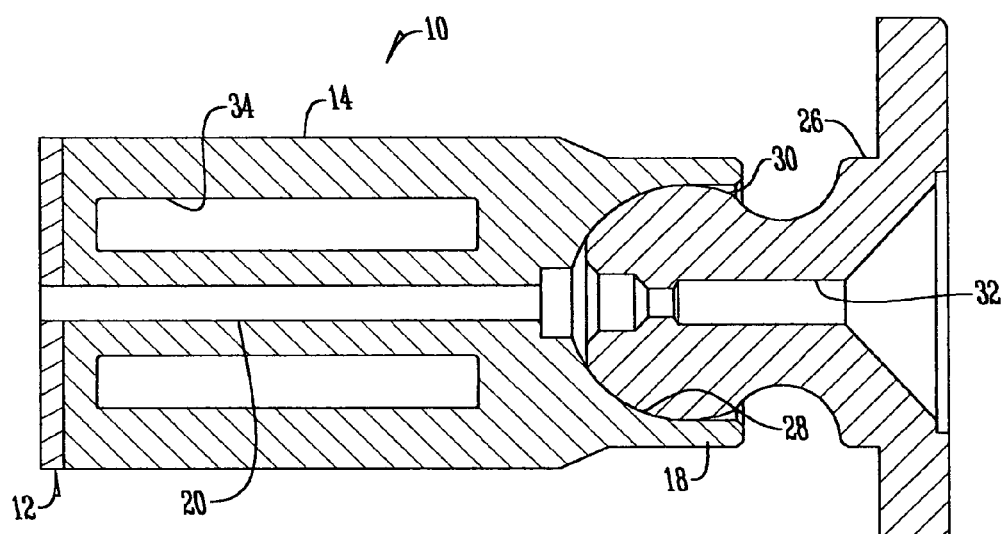
FIG. 2 is a sectional view of a closed cavity piston and slipper.

FIG. 2 shows a cross section of a closed cavity piston 10 that can be manufactured using metal injection molding and sinterbonding an end cap 12 to the body 14. The piston 10 has a slipper 26 pivotably attached to the piston. The slipper 26 can include a portion of a spherical ball that engages a ball socket recess in the piston body 14, or one skilled in the art will appreciate that the slipper 26 could be equipped with a ball socket recess and the mating surface would be formed as a portion of a spherical ball in the piston. FIG. 2 shows a piston that has a ball socket recess 28 that mates with a ball socket 30 that is on the slipper 26. Slipper 26 also has a fluid passageway 32 that fluidly connects with hollow stem 20.

The hollow stem 20 extends longitudinally throughout the entire body 14. Closed cavity piston 10 also has one or more hollow compartments 34 within its body 14.

Figure 3:
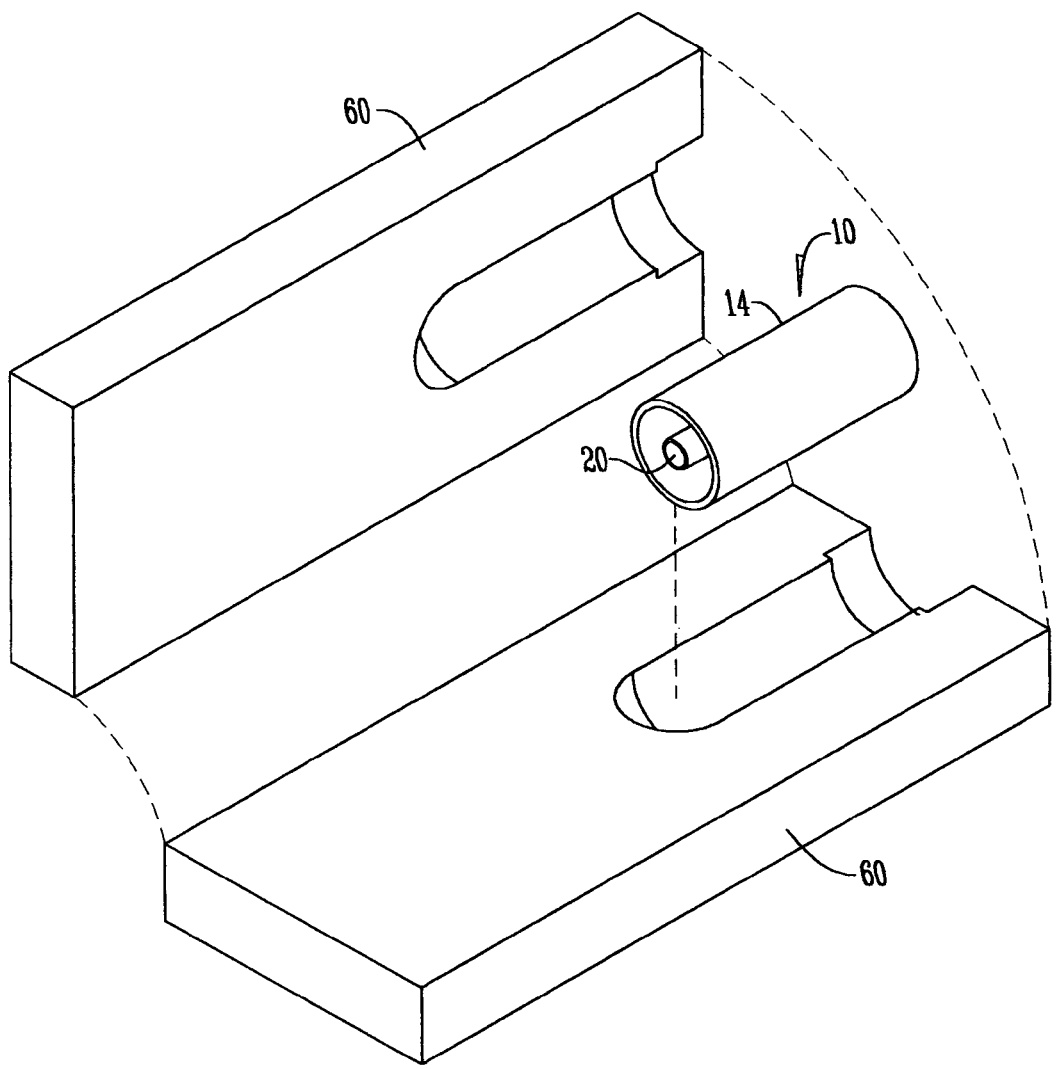
FIG. 3 is a perspective view of a metal injection molding mold.

FIG. 3 shows a typical metal injection mold 60. The mold 60 shapes the outer surface of the piston body 14 while an insert core (not shown) is used to shape the interior of the piston body 14. The end cap 12 is created in a similar mold 60 that shapes the end cap 12.

In the manufacturing process the body 14 and the end cap 12 of the closed cavity piston 10 are separately manufactured using a metal injection molding process. Next the body 14 is sintered to form the proper metallic bonding. During this process an end cap 12 is sinterbonded to the open end 15 of the piston body 14. Therefore, the only fluid outlet the piston 10 has is through the opening 23, insuring the rest of the piston 10 is plugged. It should also be appreciated that because of the use of metal injection molding techniques little if any machining of the sintered piston assembly is required. The metal injection molding and sinterbonding processes allow for a more efficient and cost effective process for creating a closed cavity piston. Thus all of the objects of the present invention have been accomplished.

It will be appreciated by those skilled in the art that other various modifications could be made to the device without departing from the spirit and scope of this invention. All such modifications and changes fall within the scope of the claims are intended to be covered thereby.

What is claimed is:

1. A closed cavity piston comprising:
    an elongated cylindrical body having a first end adapted to receive a slipper, a second end, and at least one longitudinally elongated hollow compartment;
    a bore longitudinally disposed through the elongated cylindrical body;
    an end cap secured to the second end of the elongated cylindrical body and having a central opening that aligns with the bore; and
    wherein the end cap is made of magnetic material.

2. The closed cavity piston of claim 1 wherein the elongated cylindrical body is created using a metal injection molding process.

3. The closed cavity piston of claim 1 wherein the end cap is secured to the elongated cylindrical body by sinterbonding the end cap to the body.

4. The closed cavity piston of claim 1 wherein the opening of the end cap is circular.

5. The closed cavity piston of claim 4 wherein the perimeter of the circular opening corresponds to the perimeter of the bore.

6. The closed cavity piston of claim 1 wherein the end cap is a washer.

7. The closed cavity piston of claim 1 wherein the closed cavity piston is a female piston.

8. A method of manufacturing a closed cavity piston steps comprising:
    metal injection molding an elongated cylindrical body having a first end adapted to receive a slipper, a second end, and at least one longitudinally elongated hollow compartment;
    metal injection molding an end cap having a central opening;
    sinterbonding the end cap to the elongated cylindrical body.

9. The method of claim 8 wherein the end cap has a tapered surface that matingly engages the second end of the elongated cylindrical body to aid in the sinterbonding of the end cap to the elongated cylindrical body.

10. The method of claim 8 wherein the end cap has a lip that matingly engages the second end of the elongated cylindrical body to aid in the sinterbonding of the end cap to the elongated cylindrical body.

\* \* \* \* \*